United States Patent
Emori

(10) Patent No.: US 9,868,253 B2
(45) Date of Patent: Jan. 16, 2018

(54) METHOD OF MANUFACTURING TANK, HEAT CURING METHOD AND HEAT CURING APPARATUS

(71) Applicant: TOYOTA JIDOSHA KABUSHIKI KAISHA, Toyota-shi, Aichi-ken (JP)

(72) Inventor: Sakuma Emori, Seto (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 79 days.

(21) Appl. No.: 14/904,918

(22) PCT Filed: Jul. 11, 2014

(86) PCT No.: PCT/JP2014/003695
§ 371 (c)(1),
(2) Date: Jan. 13, 2016

(87) PCT Pub. No.: WO2015/008468
PCT Pub. Date: Jan. 22, 2015

(65) Prior Publication Data
US 2016/0144560 A1    May 26, 2016

(30) Foreign Application Priority Data
Jul. 16, 2013    (JP) .................................. 2013-147408

(51) Int. Cl.
*B29C 51/30*    (2006.01)
*B29C 65/00*    (2006.01)
(Continued)

(52) U.S. Cl.
CPC .... *B29C 66/72141* (2013.01); *B29C 35/0288* (2013.01); *B29C 65/02* (2013.01);
(Continued)

(58) Field of Classification Search
CPC ... B29C 53/602; B29C 35/0288; B29C 65/02; B29C 65/481; B29C 66/636;
(Continued)

(56) References Cited

U.S. PATENT DOCUMENTS 5,219,498 A     6/1993   Keller et al.
2009/0255939 A1 10/2009  Takahashi et al.
(Continued)

FOREIGN PATENT DOCUMENTS

DE   10 2010 043 645 A1   5/2012
EP         2 740 584 A1   6/2014
(Continued)

OTHER PUBLICATIONS

Machine translation of JP 2006-334831 A.*

*Primary Examiner* — Vishal I Patel
(74) *Attorney, Agent, or Firm* — Dickinson Wright, PLLC

(57) ABSTRACT

A method of manufacturing a tank comprises providing a covered liner by winding a fiber impregnated with a thermosetting resin on a liner; and performing a heat curing process that cures the thermosetting resin by heating the covered liner in a heating furnace. The heat curing process comprises controlling the heating to prevent temperature of the thermosetting resin that is changed by the heating from exceeding a heat resistant temperature of the liner.

6 Claims, 5 Drawing Sheets

(51) Int. Cl.
  *B29C 70/06* (2006.01)
  *B29C 35/02* (2006.01)
  *B29C 65/02* (2006.01)
  *B29C 65/48* (2006.01)
  *B29C 53/60* (2006.01)
  *B29C 63/24* (2006.01)
  *B29K 101/10* (2006.01)
  *B29K 105/10* (2006.01)
  *B29L 31/00* (2006.01)

(52) U.S. Cl.
  CPC .......... *B29C 65/481* (2013.01); *B29C 66/636* (2013.01); *B29C 70/06* (2013.01); *B29C 53/602* (2013.01); *B29C 63/24* (2013.01); *B29K 2101/10* (2013.01); *B29K 2105/10* (2013.01); *B29L 2031/712* (2013.01); *F17C 2201/0104* (2013.01); *F17C 2201/056* (2013.01); *F17C 2203/0604* (2013.01); *F17C 2203/0619* (2013.01); *F17C 2221/012* (2013.01); *F17C 2223/0123* (2013.01); *F17C 2223/036* (2013.01); *F17C 2260/013* (2013.01); *F17C 2270/0168* (2013.01); *Y02E 60/321* (2013.01)

(58) Field of Classification Search
  CPC ... B29C 66/72141; B29C 70/06; B29C 63/24; Y02E 60/321; F17C 2201/0104; F17C 2201/056; F17C 2203/0604; F17C 2203/0619; F17C 2221/012; F17C 2223/0123; F17C 2223/036; F17C 2260/013; F17C 2270/0168; B29K 2101/10; B29K 2105/10; B29L 2031/712
  See application file for complete search history.

(56) References Cited

U.S. PATENT DOCUMENTS

| | | |
|---|---|---|
| 2012/0234840 A1 | 9/2012 | Strassburger et al. |
| 2015/0165703 A1* | 6/2015 | Shintani .................. B29C 53/66 156/172 |

FOREIGN PATENT DOCUMENTS

| | | | |
|---|---|---|---|
| JP | 10-231998 | 9/1998 | |
| JP | 2006-334831 | 12/2006 | |
| JP | 2007-107557 | 4/2007 | |
| JP | 2010-221401 | 10/2010 | |
| JP | 2010-265932 | 11/2010 | |
| JP | 2011-136491 | 7/2011 | |
| WO | WO 2013/023281 A1 | 2/2013 | |
| WO | WO-2013/099010 | 7/2013 | |
| WO | WO 2013099010 A1 * | 7/2013 | ........... B29D 22/003 |
| WO | WO-2013099010 A1 * | 7/2013 | ........... B29D 22/003 |

* cited by examiner

METHOD OF MANUFACTURING TANK, HEAT CURING METHOD AND HEAT CURING APPARATUS

CROSS-REFERENCE TO RELATED APPLICATIONS

This application is a national phase application of International Application No. PCT/JP2014/003695, filed Jul. 11, 2014, and claims the priority of JP Application No. 2013-147408, filed Jul. 16, 2013, the content of each of which is incorporated herein by reference.

TECHNICAL FIELD

The present invention relates to a technique regarding manufacturing a tank.

BACKGROUND ART

A high pressure natural gas tank or a high pressure hydrogen tank is used as a supply source of a fuel gas in an internal combustion engine mounted on a natural gas vehicle or in a fuel cell system mounted on a fuel cell vehicle. A known method of manufacturing such a high pressure tank is a manufacturing method using filament winding method (hereinafter may be simply referred to as "FW method"). The method of manufacturing the high pressure, tank by the FW method winds a reinforced fiber impregnated with a thermosetting resin such as an epoxy resin on the outer periphery of a liner and heats and thermally cures the thermosetting resin to form a fiber-reinforced resin layer.

As is known, the manufacturing method using the FW method provides self-heating of the thermosetting resin during heating. A known technique takes advantage of such self-heating to increase the efficiency of the heat curing process. There is, however, a problem that a temperature rise beyond expectation causes thermal degradation of the liner at a peak of self-heating of the thermosetting resin. Patent Literature 1 describes a method of manufacturing a tank that uses a heat insulating material to cover the outer circumferential surface of a liner and thereby suppresses thermal degradation. Patent Literature 2 describes a method of manufacturing a composite container that divides a heating process of a thermosetting resin into a step of decreasing the viscosity of the resin and a step of thermally curing the resin.

CITATION LIST

Patent Literature

PTL 1: JP 2010-265932A
PTL 2: JP 2010-221401A

SUMMARY

Technical Problem

The technique described in Patent Literature 1 needs the process of covering the liner with the heat insulating material. This leads to a problem that increases the workload and the cost in manufacture of the tank. The technique described in Patent Literature 2 has a problem that does not take into account thermal degradation of the liner in the heat curing process.

As described above, there is still a room for improvement with regard to the technique of suppressing thermal degradation of the liner in the heat curing process during the manufacturing process of the tank. With regard to the technique of suppressing thermal degradation of the liner, other needs include simplification and cost reduction of the manufacturing process, resource saving, and downsizing, simplified configuration and easy operation of an apparatus for implementing the manufacturing process.

Solution to Problem

In order to solve at least part of the above problems, the invention may be implemented by any of the following aspects.

(1) According to one aspect of the invention, there is provided a method of manufacturing a tank. The method of manufacturing the tank comprises (a) providing a covered liner by winding a fiber impregnated with a thermosetting resin on a liner; and (b) performing a heat curing process that cures the thermosetting resin by heating the covered liner in a heating furnace. The (b) comprises controlling the heating to prevent temperature of the thermosetting resin that is changed by the heating from exceeding a heat resistant temperature of the liner. The method of manufacturing the tank according to this aspect controls the heating in the heat curing process, in order to prevent the temperature of the thermosetting resin that is increased by the heating from exceeding the heat resistant temperature of the liner. This accordingly suppresses thermal degradation of the liner in the heat curing process during the manufacturing process of the tank. This also does not require any additional member such as heat insulating material to protect the liner and thereby simplifies the manufacturing process of the tank. This results in reducing the manufacturing cost of the tank and saving the resources in manufacture of the tank.

(2) In the method of manufacturing the tank according to the above aspect, the (b) may comprise controlling the heating such that a furnace ambient temperature increase rate after the furnace ambient temperature reaches a predetermined temperature, is higher than a furnace ambient temperature increase rate, after a start of the heating and before a furnace ambient temperature reaches the predetermined temperature, the predetermined temperature being a temperature at which rapid self-heating of the thermosetting resin is started. The method of manufacturing the tank according to this aspect controls the heating to causes the furnace ambient temperature increase rate in the heating furnace after the time when the temperature of the thermosetting resin reaches the temperature at which rapid self-heating of the thermosetting resin is started to be higher than the furnace ambient temperature increase rate in the heating furnace until the time when the temperature of the thermosetting resin reaches the temperature at which rapid self-heating of the thermosetting resin is started. This accordingly keeps the furnace ambient temperature increase rate low until the time when the temperature of the thermosetting resin reaches the temperature at which rapid self-heating of the thermosetting resin is started, thus suppressing rapid self-heating of the thermosetting resin and possible thermal runaway caused by the self-heating. This results in suppressing damage of the liner caused by thermal runaway. Additionally, this raises the furnace ambient temperature increase rate after the time when the temperature of the thermosetting resin reaches the temperature at which rapid self-heating of the thermosetting resin is started, thus rapidly increasing the furnace ambient temperature. As a result, this enables the thermosetting resin to be heated by taking advantage of self-heating of the thermosetting resin.

(3) In the method of manufacturing the tank according to the above aspect, the (b) may further comprise stopping the heating at a peak of self-heating of the thermosetting resin. The method of manufacturing the tank according to this aspect stops the heating at the peak of self-heating of the thermosetting resin. This accordingly suppresses a further increase of the peak of self-heating of the thermosetting resin. This results in suppressing possible thermal runaway caused by self-heating of the thermosetting resin and thereby suppresses damage of the liner caused by thermal runaway.

(4) In the method of manufacturing the tank according to the above aspect, the (b) may further comprise restarting the heating on termination of self-heating of the thermosetting resin. The method of manufacturing the tank according to this aspect restarts the heating on termination of self-heating of the thermosetting resin. Even in the case where the furnace ambient temperature in the heating furnace is then increased rapidly, this does not induce further self-heating of the thermosetting resin and thereby avoids an unexpected temperature rise.

(5) In the method of manufacturing the tank according to the above aspect, the (b) may comprise controlling the heating, based on a profile that is configured to relate furnace ambient temperature in the heating furnace to time. The method of manufacturing the tank according to this aspect readily controls the heating, based on the profile.

(6) in the method of manufacturing the tank according to the above aspect, the (b) may comprise controlling the heating, based on an actually measured furnace ambient temperature in the heating furnace. The method of manufacturing the tank according to this aspect accurately controls the heating, based on the actual furnace ambient temperature.

(7) In the method of manufacturing the tank according to the above aspect, the (b) may comprise controlling the heating, based on an actually measured temperature of the thermosetting resin. The method of manufacturing the tank according to this aspect accurately controls the heating, based on the actual temperature of the thermosetting resin.

(8) According to one aspect of the invention, there is provided a heat curing method. The heat curing method comprises performing a heat curing process that provides heating to heat a covered liner by winding a fiber impregnated with a thermosetting resin on a liner, in a heating furnace and cures the thermosetting resin. The performing the heat curing process comprises controlling the heating to prevent temperature of the thermosetting resin that is increased by the heating from exceeding a heat resistant temperature of the liner. The heat curing method according to this aspect suppresses thermal degradation of the liner in the heat curing process during the manufacturing process of the tank.

(9) According to one aspect of the invention, there is provided a heat curing apparatus. The heat curing apparatus comprises a heating furnace that is configured to perform a heat curing process that provides heating to heat a covered liner by winding a fiber impregnated with a thermosetting resin on a liner and cures the thermosetting resin; and a controller that is configured to control the heating in the heating furnace. The controller controls the heating to prevent temperature of the thermosetting resin that is increased by the heating from exceeding a heat resistant temperature of the liner. The heat curing apparatus according to this aspect suppresses thermal degradation of the liner in the heat curing process during the manufacturing process of the tank.

All the plurality of components included in each of the aspects of the invention described above are not essential, but some components among the plurality of components may be appropriately changed, omitted or replaced with other additional components or part of the limitations may be deleted, in order to solve part or all of the problems described above or in order to achieve part or all of the advantageous effects described herein. In order to solve part or all of the problems described above or in order to achieve part or all of the advantageous effects described herein, part or all of the technical features included in one aspect of the invention described above may be combined with part or all of the technical features included in another aspect of the invention described above to provide one independent aspect of the invention.

The invention may be implemented by any of various aspects other than the aspects of the method of manufacturing the tank. The invention may be implemented by, for example, a heat curing method and a heat curing apparatus of a thermosetting resin, an apparatus for manufacturing a tank, control methods of such apparatuses, computer programs implemented to such control programs and non-transitory storage media which such computer programs are stored in.

DESCRIPTION OF EMBODIMENTS

A. Embodiment

A-1. Manufacturing Process of Tank

Figure 1:
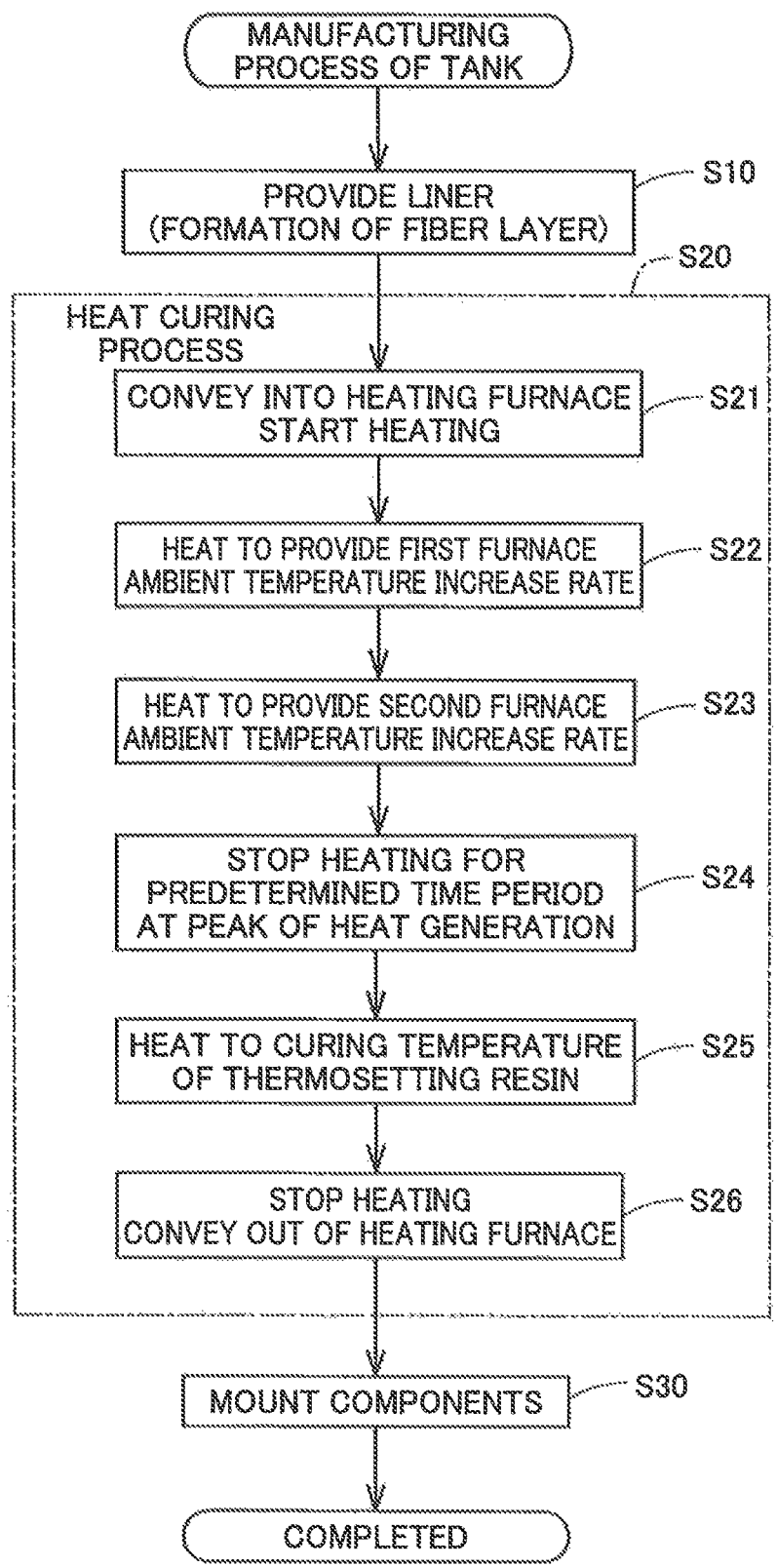
FIG. 1 is a flowchart showing a procedure of manufacturing process of a tank according to one embodiment of the invention.

FIG. 1 is a flowchart showing a procedure of manufacturing process of a tank according to one embodiment of the invention. This manufacturing process employs the filament winding method (hereinafter also called "FW method") to manufacture a high pressure tank that is configured to store a high pressure fluid such as high pressure hydrogen or high pressure natural gas.

At step S10, the manufacturing process provides a liner with a fiber layer formed thereon.

Figure 2:
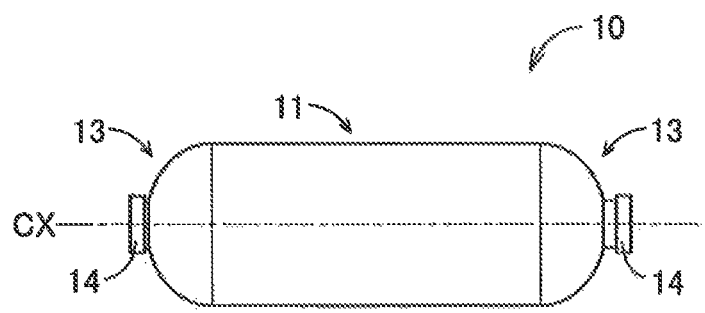
FIG. 2 is a schematic diagram illustrating the configuration of a liner.

FIG. 2 is a schematic diagram illustrating the configuration of a liner 10. The liner 10 is a hollow container including a cylinder portion 11 in an approximately cylindrical shape and dome portions 13 in an approximately hemispherical shape provided on both ends of the cylinder portion 11. The liner 10 is made of a resin material such as nylon resin. The two dome portions 13 have respective tops located on a center axis; CX of the liner 10 (shown by the one-dot chain line). Mouthpieces 14 for piping and mounting valves are provided on the tops of the respective dome portions 13. The liner 10 is, however, not necessarily limited to the configuration shown in FIG. 2 but may have another configuration.

Figure 3:
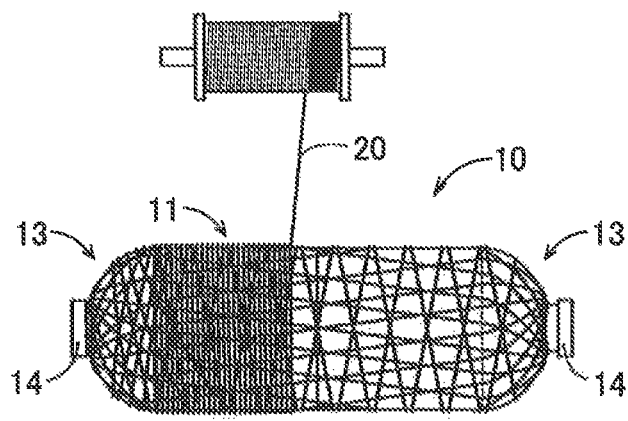
FIG. 3 is a diagram illustrating a process of forming a fiber layer on the liner.

FIG. 3 is a diagram illustrating a process of forming a fiber layer 21 on the liner 10. As shown in FIG. 3, at step S10, a reinforced fiber 20 that is impregnated in advance with a thermosetting resin is wound on a surface layer of the liner 10 by combination of hoop winding and helical winding. This forms the fiber layer 21 on the liner 10 such as to cover the cylinder portion 11 and the dome portions 13. For example, an epoxy resin may be used as the thermosetting resin, and carbon fiber may be used as the reinforced fiber 20.

Figure 4:
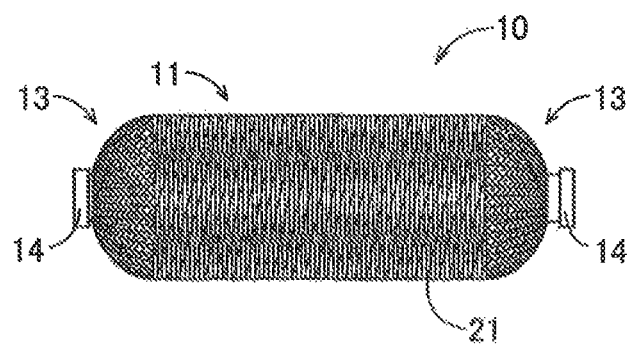
FIG. 4 is a diagram illustrating the liner after formation of the fiber layer.

FIG. 4 is a diagram illustrating the liner 10 after formation of the fiber layer 21. As shown in FIG. 4, at step S10 in the manufacturing process of the tank (shown in FIG. 1), the fiber layer 21 is formed by winding the reinforced fiber 20 impregnated with the thermosetting resin on the outer surface of the liner 10. In the description below, the liner 10 with the fiber layer 21 formed thereon is also called "covered liner".

At step S20, a heat curing process is performed to cure the thermosetting resin included in the fiber layer 21 of the covered liner.

Figure 5:
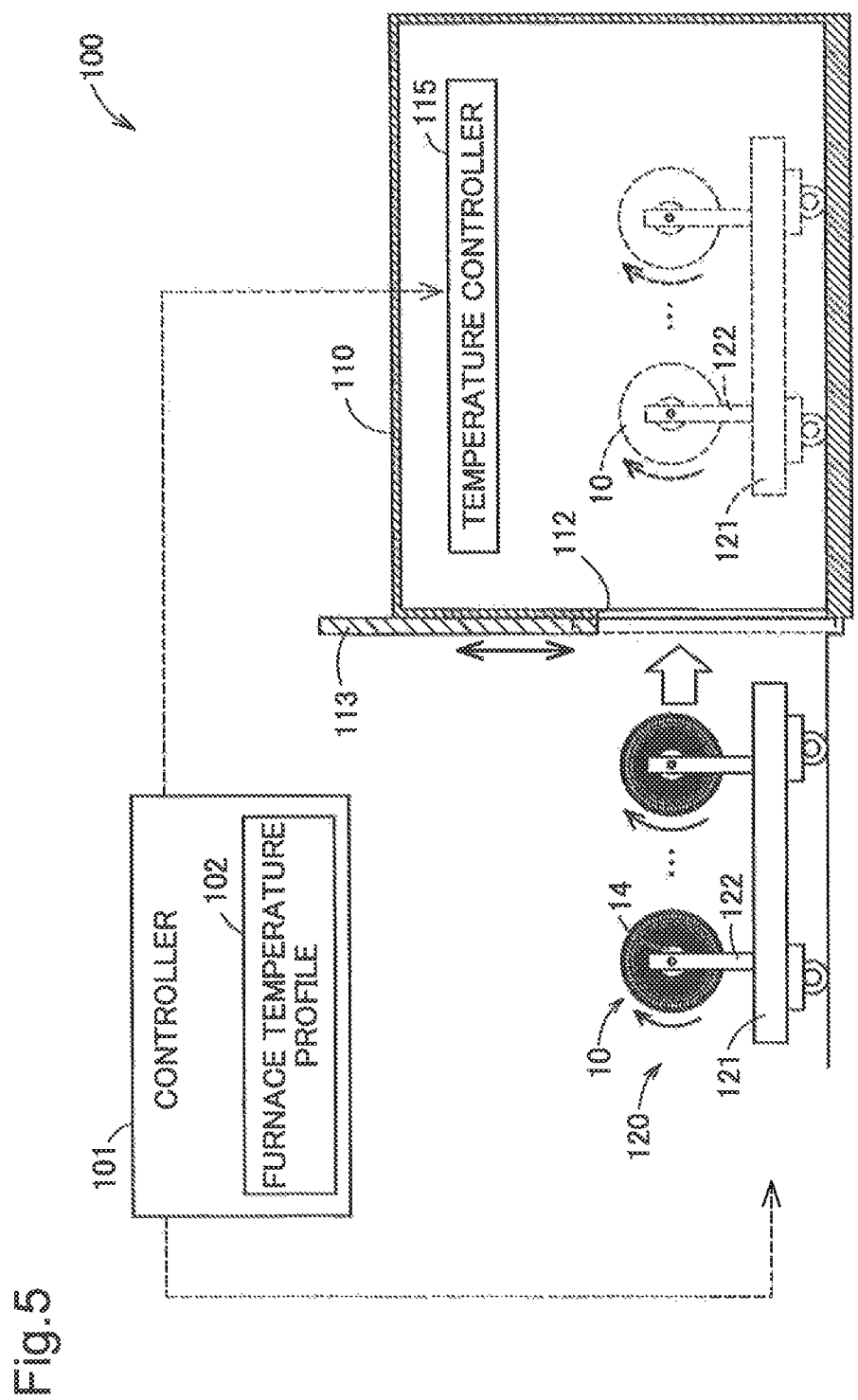
FIG. 5 is a schematic diagram illustrating the configuration of a heat curing apparatus used in a heat curing process.

FIG. 5 is a schematic diagram illustrating the configuration of a heat curing apparatus 100 used in the heat curing process. The heat curing apparatus 100 includes a controller 101, a heating furnace 110 and a liner conveyor assembly 120.

The controller 101 may be implemented by, for example, a microcomputer including a CPU and memories. The controller 101 controls heating of the covered liner in the heating furnace 110 according to a furnace temperature profile 102. The controller 101 also controls the liner conveyor assembly 120 to control conveyance of the covered liner into and out of the heating furnace 110.

Figure 6:
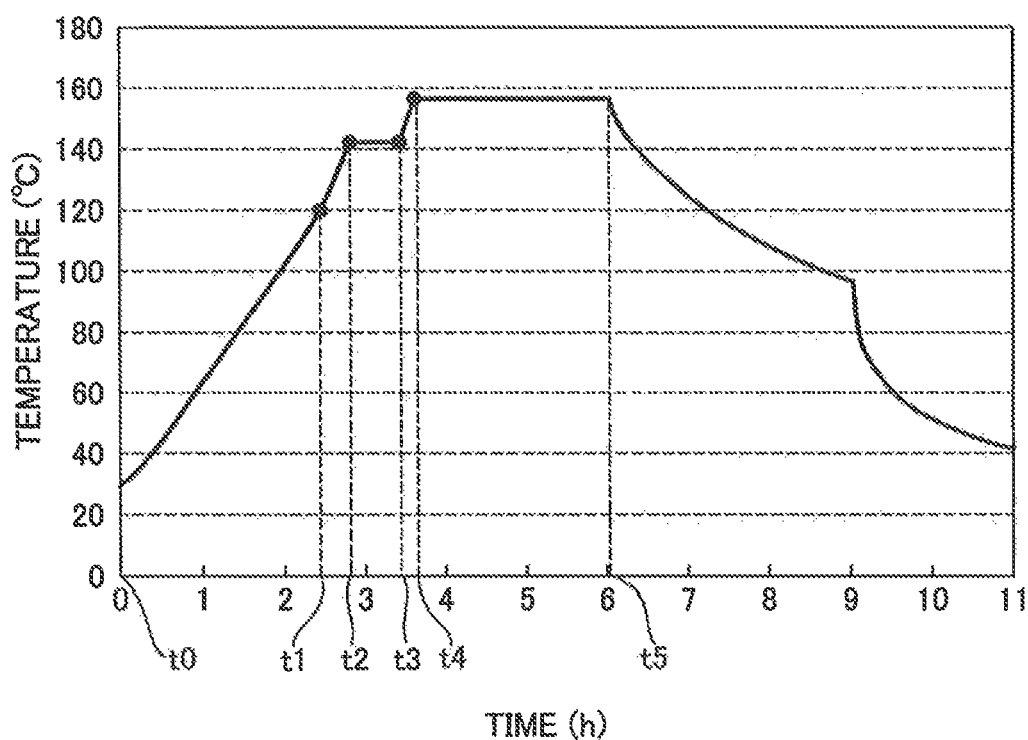
FIG. 6 is a diagram illustrating one example of furnace temperature profile.

FIG. 6 is a diagram illustrating one example of the furnace temperature profile 102. The furnace temperature profile 102 denotes a control program used by the controller 101 in the process of controlling the temperature of the heating furnace 110 to estimate in advance a temperature change of the thermosetting resin with the time. The furnace temperature profile 102 of the embodiment is specified as a relationship between the furnace ambient temperature (° C.) in the heating furnace 110 and the time (b). The furnace temperature profile 102 is created in advance by a method described in "A-2. Process of Creating Furnace Temperature Profile" and is stored in a memory of the controller 101.

In the illustrated example of the furnace temperature profile 102 in FIG. 6, the controller 101 controls heating in the heating furnace 110 to provide a first furnace ambient temperature increase rate for a time duration between a time t0 when heating is started and a time t1 when the furnace ambient temperature reaches a first temperature (about 120° C. in the illustrated example). The controller 101 subsequently controls heating in the heating furnace 110 to provide a second furnace ambient temperature increase rate for a time duration between the time t1 and a time t2 when the furnace ambient temperature reaches a second temperature (about 140° C. in the illustrated example). The controller 101 stops heating in the heating furnace 110 for a time duration between the time t2 and a time t3. The controller 101 subsequently controls heating in the heating furnace 110 to provide the second furnace ambient temperature increase rate again for a time duration between the time t3 and a time t4 when the furnace ambient temperature reaches a third temperature (about 155° C. in the illustrated example). The controller 101 then controls heating in the heating furnace 110 to keep the furnace ambient temperature at the third temperature for a time duration between the time t4 and a time t5. The controller 101 stops heating after the time t5.

The furnace ambient temperature increase rate herein denotes an increase rate of the furnace ambient temperature in the heating furnace 110 per unit time. The first furnace ambient temperature increase rate and the second furnace ambient temperature increase rate may be determined arbitrarily. According to this embodiment, the second furnace ambient temperature increase rate is set to be higher than the first furnace ambient temperature increase rate. In other words, the first and second furnace ambient temperature increase rates are set to satisfy the relation of "first furnace ambient temperature increase rate<second furnace ambient temperature increase rate".

The heating furnace 110 is provided to heat a plurality of the covered liners placed therein. The heating furnace 110 shown in FIG. 5 includes a process chamber 111 as a sealed space and a temperature controller 115. The process chamber 111 has an inlet 112 through which the covered liners are conveyed in and out by the liner conveyance assembly 120. The inlet 112 is provided with a shutter 113 that is controlled by the controller 101 to be opened and closed. The temperature controller 115 actually controls the furnace ambient temperature in the process chamber 111 of the heating furnace 110, in response to instructions from the controller 101. More specifically, the temperature controller 115 receives a measurement value from a sensor (not shown) that is configured to measure the ambient temperature in the process chamber 111, so as to obtain the furnace ambient temperature. The temperature controller 115 controls and stops heating in the process chamber 111 to make the obtained furnace ambient temperature equal to a temperature indicated by the controller 101.

The liner conveyance assembly 120 includes a carriage 121 that is configured to hold and convey a plurality of the covered liners. The liner conveyance assembly 120 is configured to convey the covered liners into and out of the process chamber 111 of the heating furnace 110. The carriage 121 includes a plurality of supports 122 configured to horizontally support a plurality of covered liners and serves to hold the plurality of covered liners in parallel. The respective supports 122 are connected with a power source such as motor (not shown) to rotate the respective covered liners held thereby at a predetermined rotation speed.

At step S21 in the manufacturing process of the tank (shown in FIG. 1), the controller 101 opens the shutter 113 at the inlet 112 to convey the covered liners mounted on the carriage 121, together with the carriage 121, into the process chamber 111 of the heating furnace 110. The controller 101 closes the shutter 113 and subsequently gives an instruction to the temperature controller 115 to start heating. During the heat curing process, in order to suppress uneven heating, the controller 101 may cause the respective covered liners to be rotated by the supports 112 of the carriage 121.

At step S22, the controller 101 gives an instruction to the temperature controller 115 to heat at the first furnace ambient temperature increase rate, based on the setting between the time t0 and the time t1 in the furnace temperature profile 102 (shown in FIG. 6). At step S23, the controller 101 gives an instruction to the temperature controller 115 to heat at the second furnace ambient temperature increase rate, based on the setting between the time t1 and the time t2 in the furnace temperature profile 102. At step S24, the controller 101 gives an instruction to the temperature controller 115 to stop heating for a predetermined time period, based on the setting between the time t2 and the time t3 in the furnace temperature profile 102.

At step S25, the controller 101 gives an instruction to the temperature controller 115 to restart and continue heating to the heating rate of the thermosetting resin, based on the setting between the time t3 and the time t5 in the furnace temperature profile 102. At step S26, the controller 101 gives an instruction to the temperature controller 115 to stop heating, based on the setting at the time t5 in the furnace temperature profile 102. After a predetermined time has elapsed since stop of heating, the controller 101 opens the shutter 113 at the inlet 112 and conveys the covered liners mounted on the carriage 121, together with the carriage 121, out of the process chamber 111 of the heating furnace 110. The heat curing process described above (steps S21 to S26) cures the thermosetting resin in the fiber layer 21 placed on the surface of the covered liner (shown in FIG. 2) to form a reinforced fiber resin layer.

After completion of the heat curing process, at step S30, the manufacturing process mounts specified components on the mouthpieces 14 of the liner 10 and the surface of the reinforced fiber resin layer of the liner 10, so as to complete the tank.

A-2. Process of Creating Furnace Temperature Profile

Figure 7:
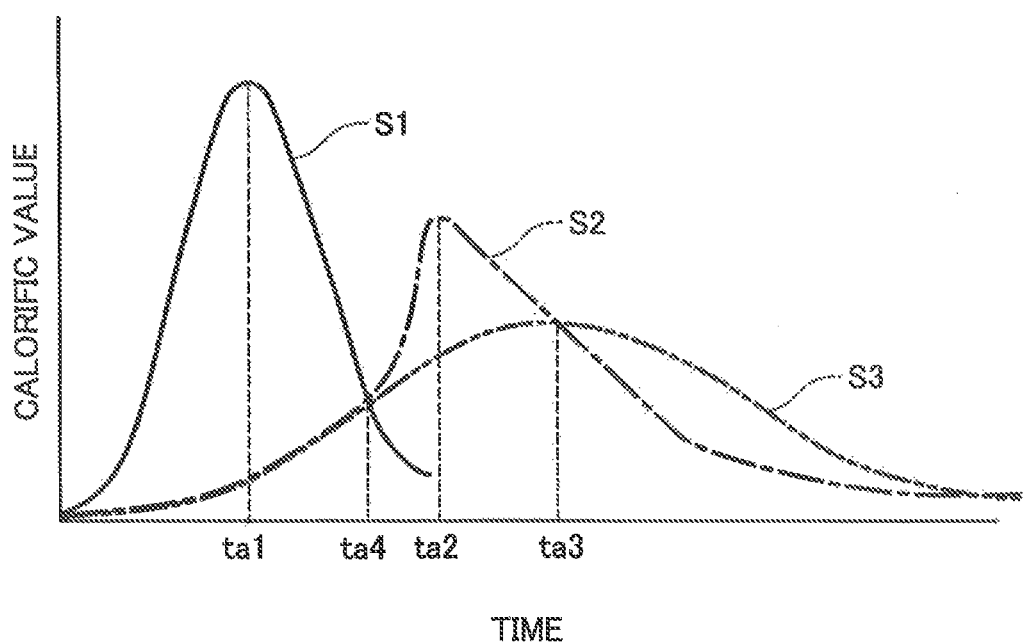
FIG. 7 is a diagram illustrating a process of creating the furnace temperature profile.

FIG. 7 is a diagram illustrating a process of creating the furnace temperature profile 102. FIG. 7 shows experimental results of a relationship between the calorific value of the thermosetting resin and the time with regard to three different temperature rise rates of the furnace ambient temperature.

A curve S1 shows a relationship between the calorific value of the thermosetting resin and the time in the case where the furnace ambient temperature is increased at a rapid rate (hereinafter expressed as "high temperature rise rate") continuously from the start of heating to the end of the heating. According to the curve S1, at the high temperature rise rate, the calorific value of the thermosetting resin increases slowly for a short time period after the start of heating, subsequently increases rapidly, reaches a peak at a time ta1 and then decreases rapidly. A curve S3 shows a relationship between the calorific value of the thermosetting resin and the time in the case where the furnace ambient temperature is increased at a slow rate (hereinafter expressed as "low temperature rise rate") continuously from the start of heating to the end of heating. According to the curve S3, at the low temperature rise rate, the calorific value of the thermosetting resin continuously increases slowly from the start of heating, reaches a peak at a time ta3 and then decreases slowly.

A curve S2 shows a relationship between the calorific value of the thermosetting resin and the time in the case where the furnace ambient, temperature is increased at a slow rate for a predetermined time period after the start of heating and is then increased at a rapid rate. In other words, the curve S2 shows the result of measurement under the mixed condition of the temperature rise rate of the curve S1 and the temperature rise rate of the curve S3. According to the curve S2, in the case where the temperature rise rate is set to the low temperature rise rate for the predetermined time period after the start of heating and is then set to the high temperature rise rate, the calorific value of the thermosetting, resin increases slowly from the start of heating, subsequently increases rapidly reaches a peak at a time ta1 and then decreases relatively slowly.

The total calorific value of the thermosetting resin is shown by the area of a portion surrounded by each of the curves S1, S2 and S3 and the time axis. All the curves all the temperature rise rate conditions) provide an identical total calorific value. The thermosetting resin has the self-heating property that causes heat generation of the resin itself by heating. It is known that self-heating of the thermosetting resin proceeds rapidly when the temperature of the thermosetting resin accompanied with an increase in furnace ambient temperature exceeds a certain temperature. As remarkably indicated by the curve S1 in FIG. 7, the calorific value of the thermosetting resin has the higher peak at the higher temperature rise rate. This is attributed to "thermal runaway" that causes self-heating of the thermosetting resin to proceed rapidly by a rapid increase of the temperature of the thermosetting resin over the certain temperature and causes self-heating of the thermosetting resin to further proceed rapidly by a further increase of the temperature of the thermosetting resin.

The thermal runaway increases the temperature of the thermosetting resin to an extremely high temperature and causes the temperature of the thermosetting resin to exceed the heat resistant temperature of the liner 10. This causes a problem of the damaged (fused or deformed) liner 10. The "heat resistant temperature of the liner 10" means a temperature that causes no deformation of the liner 10 and no deterioration of the mechanical characteristics when the liner 10 is kept in the temperature for a predetermined time period. As remarkably indicated by the curve S3, continuously heating at the low temperature rise rate, on the other hand, lowers the peak of the calorific value of the thermosetting resin but causes a problem of the extended time period until completion of self-heating of the thermosetting resin.

The inventors of the present invention have found that the process of heating at the low temperature rise rate for a predetermined time period after the start of heating to cause heat generation of the thermosetting resin to proceed to some extent and subsequently heating at the high temperature rise rate to cause heat generation of the thermosetting resin to proceed rapidly like the curve S2 shortens the time period until completion of self-heating of the thermosetting resin, while lowering the peak of the calorific value of the thermosetting resin. The inventors of the present invention have also found that it is preferable to stop external heating at the time when the thermosetting resin reaches a peak of the calorific value in order to further lower the peak of the calorific value of the thermosetting resin and it is preferable to switch over from the low temperature rise rate to the high temperature rise rate at the time when the thermosetting resin is heated to the temperature at which rapid self-heating of the thermosetting resin is started (time ta4 in FIG. 7).

The following conditions 1 to 3 are specified in advance with respect to the type of the thermosetting resin used for the reinforced fiber 20 (shown in FIG. 2) and are used for creation of the furnace temperature profile 102:

(1) temperature at which the thermosetting resin starts rapid self-heating;

(2) peak of the calorific value when the covered liner using the thermosetting resin is heated according to a heating pattern similar to the curve S2 in FIG. 7 or more specifically when the covered liner is heated at a low temperature rise rate from the start of heating to the time when the thermosetting resin reaches the temperature at which rapid self-heating of the thermosetting resin is started and is then heated at a high temperature rise rate; and (3) curing temperature of the thermosetting resin.

According to this embodiment, in order to readily control the temperature of the thermosetting resin, the "furnace ambient temperature" is controlled according to the temperature profile 102. This is based on that heat transmission causes the temperature of the thermosetting resin to be approximately equal to the furnace ambient temperature.

Figure 8:
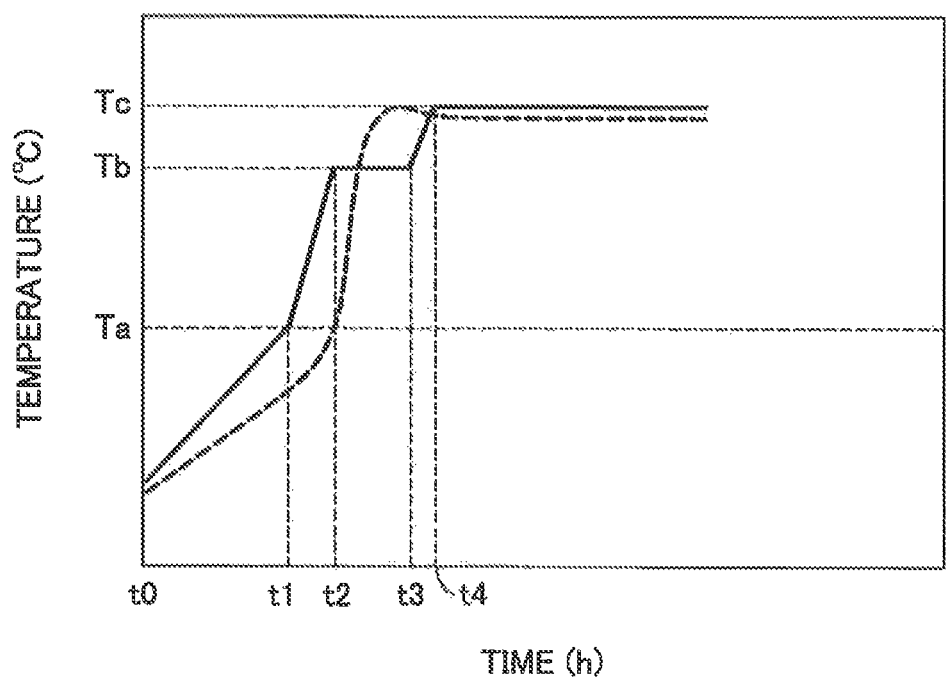
FIG. 8 is a diagram illustrating one example of the created furnace temperature profile.

FIG. 8 is a diagram illustrating one example of the furnace temperature profile 102 created as described above. In FIG. 8, the furnace temperature profile 102 is shown by a solid line curve, and a variation in temperature of the thermosetting resin by the heat curing process according to the furnace temperature profile 102 is shown by a broken line curve.

The furnace temperature profile 102 heats at a low temperature rise rate for a time duration between a heating start time t0 and a time t1 when the temperature of the thermosetting resin reaches a temperature Ta at which rapid self-heating of the thermosetting resin is started. The temperature Ta corresponds to the above condition 1 and the first temperature in FIG. 6. The furnace temperature profile 102 heats at a high heat generation rate for a time duration between the time t1 and a time t2 when the temperature of the thermosetting resin reaches a temperature Tb at which the calorific value reaches a peak. The temperature Tb corresponds to the above condition 2 and the second temperature in FIG. 6. When the increase rate of the furnace ambient temperature for the time duration between the heating start time t0 and the time t1 is specified as the first furnace ambient temperature increase rate and the increase rate of the furnace ambient temperature for the time duration between the time t1 and the time t2 is specified as the second furnace ambient temperature increase rate, the first and second furnace ambient temperature increase rates are set to satisfy the relation of "first furnace ambient temperature increase rate<second furnace ambient temperature increase rate".

The furnace temperature profile 102 subsequently stops heating for a time duration between the time t2 when the thermosetting resin has a peak of the calorific value and the time t3 when self-heating of the thermosetting resin is terminated. The furnace temperature profile 102 heats at a high heat generation rate again for a time duration between the time t3 and a time when the temperature of the thermosetting resin reaches a curing temperature Tc of the thermosetting resin. The temperature Tc corresponds to the above condition 3 and the third temperature in FIG. 6. The furnace temperature profile 102 provides heating to keep the curing temperature To of the thermosetting resin after the time t4.

A-3. Advantageous Effects

In the heat curing process using this furnace temperature profile 102, the temperature of the thermosetting resin (shown by the broken line curve in FIG. 8) placed on the surface layer of the covered liner slowly increases with an increase in furnace ambient temperature for the time duration between the time t0 and the time t1. For the time duration between the time t0 and the time t1, heating is controlled at a low temperature rise rate such as to increase the furnace ambient temperature in the heating furnace 110 at the first furnace ambient temperature increase rate. This suppresses rapid self-heating of the thermosetting resin and possible thermal runaway caused thereby.

The temperature of the thermosetting resin subsequently rises at a higher rate than the increase rate of the furnace ambient temperature, accompanied with self-heating of the thermosetting resin, for the time duration between the time t1 and the time t2. For the time duration between the time t1 and the time t2, heating is controlled such as to increase the furnace ambient temperature in the heating furnace 110 at the second furnace ambient temperature increase rate that is higher than the first furnace ambient temperature increase rate. This enables the thermosetting resin to be heated by taking advantage of self-heating of the thermosetting resin. In other words, the heat curing process is performed with high efficiency by taking advantage of the self-heating characteristic of the thermosetting resin.

The temperature of the thermosetting resin is then maximized with a peak of self-heating of the thermosetting resin for the time duration between the time t2 and the time t3. For the time duration between the time t2 and the time t3, heating is stopped to suppress a further increase of the peak of self-heating of the thermosetting resin. Accordingly this suppresses possible thermal runaway caused by self-heating of the thermosetting resin and thereby suppresses damage (fusion or deformation) of the liner 10 caused by thermal runaway.

The temperature of the thermosetting resin slowly decreases for the time duration between the time t3 and the time t4, due to the reverse phenomenon of the furnace ambient temperature (shown by the solid line curve in FIG. 8) and the temperature of the thermosetting resin (shown by the broken line curve in FIG. 8). For the time duration between the time t3 and the time t4, self-heating of the thermosetting resin is terminated, so that heating to provide the second furnace ambient temperature increase rate that is higher than the first furnace ambient temperature increase rate (i.e., heating at the high temperature rise rate) does not induce further self-heating of the thermosetting resin and thereby avoids an unexpected temperature rise.

Additionally, heating may be controlled to provide the second furnace ambient temperature increase rate (i.e., heating at the high temperature rise rate) for the time duration between the time t1 and the time t2 and for the time duration between the time t3 and the time t4. This configuration shortens the time period required for the heat curing process, compared with a configuration of heating to provide the first furnace ambient temperature increase rate (i.e., heating at the low temperature rise rate) over the entire heat curing process. Eventually the temperature of the thermosetting resin is kept stable at a temperature slightly lower than the curing temperature of the thermosetting resin after the time t4.

As described above, the manufacturing process of the tank (shown in FIG. 1) using the furnace temperature profile 102 and the heat curing apparatus 100 (shown in FIG. 5) using the furnace temperature profile 102 control heating in the heat curing process so as to control the temperature of the thermosetting resin during the heat curing process. This accordingly controls heating to prevent the temperature of the self-heated thermosetting resin from exceeding the heat resistant temperature of the liner 10. This results in suppressing thermal degradation of the liner 10 in the heat curing process during the manufacturing process of the tank and improving the quality of the resulting tank. Additionally, the manufacturing process of the tank (shown in FIG. 1) using the furnace temperature profile 102 and the heat curing apparatus 100 using the furnace temperature profile 102 do not require any additional member such as heat insulating material to protect the liner 10. This accordingly simplifies the heat curing process, the manufacturing process of the tank including the heat curing process and the heat curing apparatus. This results in reducing the manufacturing cost of the tank and saving the resources in manufacture of the tank.

B. Modifications

Among the components in each of the embodiments described above, any of the components other than those described in independent claims are additional components and may be omitted appropriately. The invention is not limited to any of the embodiments described above but may be implemented by a diversity of other configurations without departing from the scope of the invention. Some examples of possible modifications are given below.

* Modification 1:

The above embodiment (shown in FIG. 1) describes one example of the manufacturing process of the tank. The procedure of manufacturing process of the tank may however, be modified arbitrarily within the scope of the invention. For example, part of the steps may be omitted; new steps may be added; and some steps may be changed.

For example, according to a modification, step S24 in FIG. 1 may be omitted. Since self-heating of the thermosetting resin proceeds to some extent at step S22, thermal runaway of the thermosetting resin is suppressed at step S23. Accordingly, this modification with omission of step S24 still suppresses thermal degradation of the liner after the heat curing process to some extent.

* Modification 2:

The above embodiment (shown in FIG. 5) describes one example of the configuration of the heat curing apparatus. The configuration of the heat curing apparatus may however, be modified in various ways within the scope of the invention. For example, part of the components may be deleted; new components may be added; and some components may be changed.

For example, according to the above embodiment, the controller controls heating of the liner in the heating furnace according to the furnace temperature profile stored in the memory. In other words, the above embodiment controls the "time" of heating of the liner in the heating furnace, based on the temperature change of the thermosetting resin estimated in advance according to the furnace temperature profile. According to a modification, the controller may be configured to detect that the actually measured furnace ambient temperature in the heating furnace satisfies the above conditions 1 to 3 and control heating of the liner in the heating furnace. The furnace ambient temperature may be obtained from, for example, a temperature sensor configured to measure the furnace ambient temperature. Similarly, according to another modification, the controller may be configured to detect that the actually measured temperature of the thermosetting resin of the covered liner satisfies the above conditions 1 to 3 and control heating of the liner in the heating furnace. The temperature of the thermosetting resin may be obtained from, for example, a temperature sensor configured to measure the temperature of the thermosetting resin. Such modifications accurately control heating, based on the actual furnace ambient temperature or based on the actual temperature of the thermosetting resin. The furnace temperature profile may be omitted in these modifications.

The invention is not limited to any of the embodiments, the examples and the modifications described above but may be implemented by a diversity of other configurations without departing from the scope of the invention. For example, the technical features of any of the embodiments, examples and modifications corresponding to the technical features of each of the aspects described in Summary may be replaced or combined appropriately, in order to solve part or all of the problems described above or in order to achieve part or all of the advantageous effects described above. Any of the technical features may be omitted appropriately unless the technical feature is described as essential herein.

REFERENCE SIGNS LIST 10 liner
11 cylinder portion
13 dome portion
14 mouthpiece
20 reinforced fiber
21 fiber layer
100 heat curing apparatus
101 controller
102 furnace temperature profile
110 heating furnace
111 process chamber
112 inlet
113 shutter
115 temperature controller
120 liner conveyor assembly
121 carriage
122 support
CX center axis
Ta temperature
Tb temperature
Tc curing temperature

The invention claimed is:

1. A method of manufacturing a tank, comprising:
   (a) providing a covered liner by winding a fiber impregnated with a thermosetting resin on a resin liner; and
   (b) performing a heat curing process that cures the thermosetting resin by heating the covered liner in a heating furnace, wherein
   the (b) comprises controlling the heating to prevent temperature of the thermosetting resin that is changed by the heating from exceeding a heat resistant temperature of the liner, and wherein
   a second furnace ambient temperature increase rate after a furnace ambient temperature reaches a predetermined temperature, is higher than a first furnace ambient temperature increase rate after a start of the heating and before the furnace ambient temperature reaches the predetermined temperature, the predetermined temperature being a temperature at which rapid self-heating of the thermosetting resin is started.

2. The method of manufacturing the tank according to claim 1, wherein the (b) further comprises stopping the heating at a peak of self-heating of the thermosetting resin.

3. The method of manufacturing the tank according to claim 2, wherein the (b) further comprises restarting the heating on termination of self-heating of the thermosetting resin.

4. The method of manufacturing the tank according to claim 1,
   wherein the (b) comprises controlling the heating, based on a profile that is configured to relate furnace ambient temperature in the heating furnace to time.

5. The method of manufacturing the tank according to claim 1,
   wherein the (b) comprises controlling the heating, based on an actually measured furnace ambient temperature in the heating furnace.

6. The method of manufacturing the tank according to claim 1,
   wherein the (b) comprises controlling the heating, based on an actually measured temperature of the thermosetting resin.

* * * * *